Nov. 17, 1964 J. V. BATLEY 3,157,860

CORE DRIVER CHECKING CIRCUIT

Filed June 30, 1958 2 Sheets-Sheet 1

INVENTOR.
JAMES V. BATLEY

BY George Baron

ATTORNEY

Nov. 17, 1964 J. V. BATLEY 3,157,860

CORE DRIVER CHECKING CIRCUIT

Filed June 30, 1958 2 Sheets-Sheet 2

United States Patent Office 3,157,860
Patented Nov. 17, 1964

3,157,860
CORE DRIVER CHECKING CIRCUIT

James V. Batley, Kingston, N.Y., assignor to International Business Machines Corporation, New York, N.Y., a corporation of New York Filed June 30, 1958, Ser. No. 745,507
2 Claims. (Cl. 340—174)

This invention relates to computer circuits employing magnetic cores, and more particularly to a means for checking the operation of the driving circuits that supply switching energy to such cores.

Modern electronic computers employ hundreds of thousands of bistable magnetic cores as elements for storing digital information represented in binary form. An exemplary magnetic memory unit for storing such digital information might include 33 matrices of cores and each matrix would consist of 4096 cores. Such a magnetic memory unit is shown and described in a copending application of Francis R. Durgin et al. for a "Transformer Matrix System," filed on May 20, 1954, having the Serial No. 431,164 and assigned to the same assignee as applicant's assignee. In the above noted copending application, a three dimensional array of magnetic cores was employed, and the addressing system for such array was capable of selectively writing in and reading out a thirty-three bit word. The method of writing and reading consists of a coincident current drive. A first wire will thread all the cores in a given X-plane, such wire being adapted to carry a current pulse from an X-plane driving circuit. Each of the cores in a given X-plane will be threaded with a second wire, such second wire being adapted to carry a current pulse from a Y-plane driving circuit. Each X-plane or Y-plane driving pulse, by itself, is insufficient during a write operation to switch a core from its non-store state to its store state. Each driving pulse is considered a half-select pulse and it requires a coincidence of two half-select pulses to provide sufficient switching energy to a specific core in an array. By the same token, coincident current drive may be relied upon to effect a return of a core from its store state to its non-store state.

The above noted magnetic core array will also include a third wire that threads all the cores, such third wire being adapted to supply a current pulse that negates the effect of the current pulse appearing in the second wire. Such third wire carries a Z-plane driving current and is referred to as the "inhibit" winding in that its presence during the coincidence of an X-plane driving pulse and a Y-plane driving pulse will prevent the read-in of a binary "1" into a core. The cores of the magnetic array are also threaded with a fourth winding, referred to as a "sense" winding, such sense winding detecting the change of state of a core in going from its store state to its non-store state. Such change of state results in an induced current appearing in the sense winding, which induced current may be amplified and submitted as a signal pulse to a suitable output circuit coupled to said sense winding.

It has been found that there are four common error conditions that may arise in the aforementioned coincident current type operation. First, two X-plane drivers (or two Y-plane drivers) may be putting out sufficient current to switch selected cores whereas the address calls for only one drive plane to be conducting. Secondly, a driver output may supply insufficient current to switch a selected core. Thirdly, a driver (X-plane or Y-plane) may be carrying more than its sufficient current so that non-selected cores will switch. Finally, the failure to obtain a parity check will indicate faulty transmission of a word into the magnetic memory core unit. The present invention provides means for not only testing whether or not the first three error conditions exist, but also permits the same testing means to transmit a parity bit to a compare station so as to allow for the detection of bad address parity.

The invention consists of placing three cores in series with each output line of a transformer matix that feeds into a magnetic memory unit. One transformer matrix supplies driving current for the cores lying in the X-plane of the memory array and one transformer matrix will supply driving current for the cores lying in the Y-plane of the memory array. In a magnetic memory unit of the type shown in copending application, Serial No. 431,164, there will be 64 such groups of three cores for the 64 output lines of the transformer matrix associated with the X-plane driving circuit and 64 such groups of three cores for the output lines associated with the transformer matrix associated with the Y-plane driving circuit. The three cores in each group are individually made to have different responses to core driver current. For example, the first of the three cores will be the easiest of the three to switch in response to driver current, whereas the second core will be more reluctant to switch in response to the same driver current, and the third core will be the most reluctant to switch. Separate sense windings are coupled to these separate trio of cores and the switching of only one, two or all three cores by a single current driving pulse will determine whether or not a failure exists in the nature of that failure, namely, whether more than one X-driver (or Y-driver) is putting out sufficient current to switch some half-selected cores (failure), whether the current driving pulse is putting out sufficient current to switch all selected cores (no failure), or whether such current pulse is producing sufficient current to switch only some of the selected cores (failure). In a manner to be hereinafter explained, the second core of the trio of cores is also used to check the transmission of the address to the memory address register.

Consequently it is an object of this invention to provide a novel checking circuit for a read or write selection circuit of a magnetic memory unit.

It is a further object to provide a checking circuit utilizing magnetic cores.

It is yet another object to provide a checking circuit capable of performing a plurality of checking operations without the need to make substantial changes in existing magnetic memory units.

Other objects of the invention will be pointed out in the following description and claims illustrated in the accompanying drawings which disclose, by way of example, the principle of the invention and the best mode which has been contemplated of applying that principle.

Figure 3:
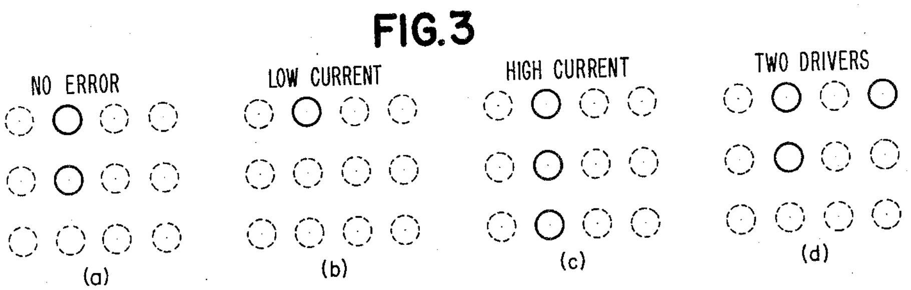

FIGS. 3*a*, 3*b*, 3*c*, and 3*d* illustrate the type of checks performed by the embodiment of the invention illustrated in FIG. 3.

Figure 1:
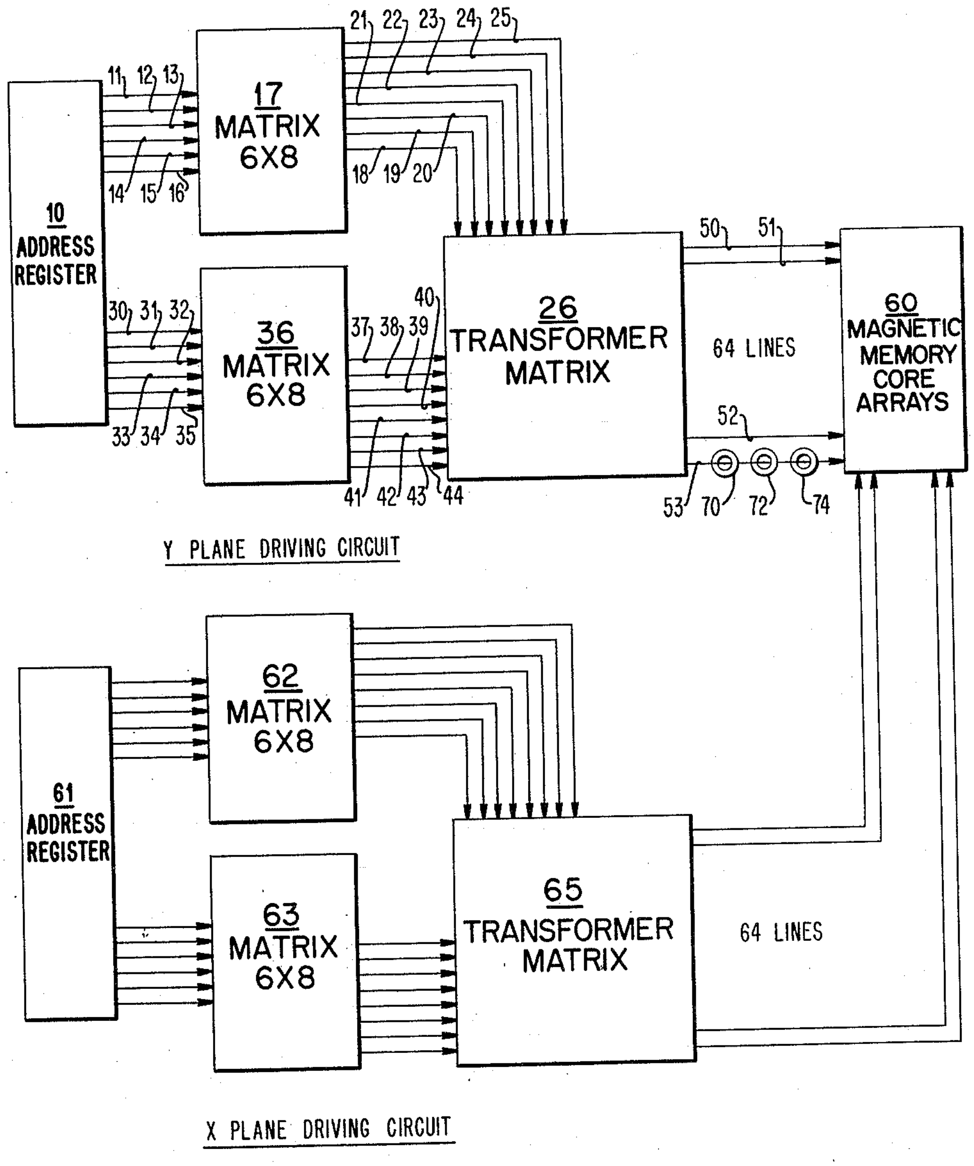
FIG. 1 is a schematic diagram of a magnetic core storage system showing the principal components of the invention in block form.

Reference is made to FIG. 1 wherein an address register 10 shown in block form is connected by six output lines, 11 through 16 inclusive, to a matrix 17 which in turn is connected by eight output lines, 18 through 25 inclusive, to a transformer matrix 26. A matrix having L input lines and K output lines will be referred to as an L x K matrix for convenience. Matrix 17, for example, will be referred to as a 6 x 8 matrix. The address register 10 is further connected to six additional lines, numbered 30 through 35, to a 6 x 8 matrix 36 which is connected by lines 37 through 44 to the transformer matrix 26. It is seen that the upper half of the output lines of the address register 10 supplies signals to matrix 17, whereas the lower half of the output lines supplies signals to matrix 36. Matrices 17 and 36 are preferably of the same type, for example, if matrix 17 is a crystal matrix, matrix 36 is also a crystal matrix.

The address register 10 may be any of a variety of well-known types such as a vacuum tube register composed of flip-flops, a relay register composed of electromagnetic relays, a magnetic or transistor register, etc. Likewise, matrix 17 need not be a crystal matrix but could be any one of a plurality of well known types. One suitable circuit illustrating the upper half of address register 10 and matrix 17 in detail is disclosed in an article entitled "Rectifier Networks for Multiposition Switching," published in the Proceedings of the I.R.E. in February 1949 on pages 139–147. Particular reference is made to FIGS. 3 and 20 of that article. The circuits for the lower half of address register 10 and matrix 36 are preferably a duplication of that used for the upper half of address register 10 and matrix 17 regardless of the particular type of address register or particular type of matrix selected.

Transformer matrix 26 is connected by sixty-four output lines to a magnetic memory unit composed of a plurality of magnetic core arrays. Only two lines numbered 50 and 51 on one end of the sixty-four output lines of transformer matrix 26 and two lines numbered 52 and 53 on the opposite end are shown. The magnetic memory unit 60 is a three dimensional system of magnetic core arrays forming 4096 magnetic core registers of thirty-three bits each. The sixty-four output lines from transformer matrix 26 supply energy to the Y-coordinate lines of the magnetic memory unit 60, such lines being referred to as Y-drivers. Address register 10, matrix 17, matrix 36 and transformer matrix 26 constitute the driving circuit for selectively energizing any one of the Y-coordinate lines of the magnetic memory unit 60.

The X-plane driving circuit for the magnetic memory unit 60 shown in the lower half of FIG. 1 is like the Y-plane driving circuit shown in the upper half of FIG. 1. An address register 61 is connected by the output lines of the upper half thereof to a 6 x 8 matrix 62 and by the output lines of the lower half to a 6 x 8 matrix 63. The outputs of matrices 62 and 63 feed into a transformer matrix 65 which is identical to transformer matrix 26, and the outputs of transformer matrix 65 constitute the X-drivers for magnetic memory unit 60. By energizing the address registers 10 and 61 with proper signals any one of the 4096 magnetic registers in the magnetic memory unit 60 can be selected for reading or writing information therein.

In the operation of the Y-plane driving circuit (which is similar to the operation of the X-plane driving circuit), an address signal from the address register 10 causes various ones of the output lines 11 through 16 and various ones of the output lines 30 through 35 to be energized. Activation of certain ones of the lines 11 through 16 causes matrix 17 to energize only one of the lines 18 through 25, and activation of certain ones of lines 30 through 35 cause matrix 36 to energize only one of the lines 37 through 44. In other words, the address register 10 can be controlled to selectively energize any one output line of matrix 17 and any one output line of matrix 36. Transformer matrix 26 will, therefore, have only one input line of the group of lines 18 through 25 and only one input line of the group of lines 37 through 44 energized, which in turn cause this matrix to energize only one of its sixty-four output lines 50, 51, etc. feeding the Y-coordinate lines of the magnetic memory unit 60. In a like manner, the X-plane driving circuit selects one of the sixty-four X-coordinate lines of the magnetic memory unit 60. By means of the aforementioned system of addressing the X and Y coordinate lines, any register in the magnetic memory unit 60 can be selected for storage or interrogation. In order to ascertain whether or not one and only one Y-coordinate line is energized as well as to ascertain whether or not a single Y-coordinate line is energized with a current pulse that is equal to, below, or above a predetermined value, three cores 70, 72, and 74 are inserted in the path of each coordinate line so as to be affected by current flowing in such coordinate line.

Figure 2:
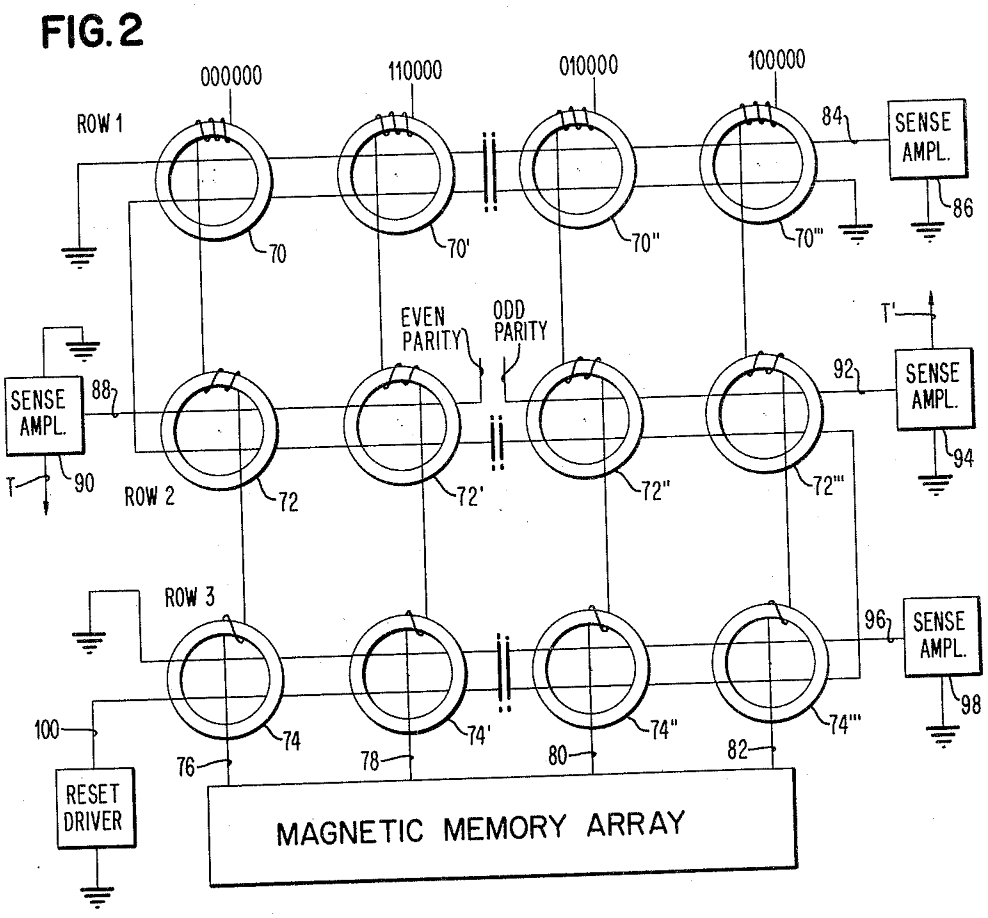
FIG. 2 is a wiring diagram of the invention as it is applied to check the driving circuit for the X-plane of magnetic cores.

FIG. 2 is a showing of the invention as it is applied to the checking of the Y-drivers or those sixty-four lines 50, 51, 52, 53, etc. that select the Y-coordinate of a register in the magnetic memory unit 60. It is understood that the same checking circuit is applied to the sixty-four X-driver lines, such similar circuit being omitted from the drawing since its showing is unnecessary for a proper understanding of the invention. Although there are sixty-four X-driver lines serving as inputs to memory units 60, only four such lines are shown in FIG. 2 in illustrating the invention, namely, lines 76, 78, 80 and 82. Cores 70, 72 and 74 represent one column of cores of the check circuit. Cores 70′, 70″, 70‴, etc. form a first row of sixty-four checking cores, cores 72, 72′, 72″, etc. form a second row of checking cores, and cores 74, 74′, 74″, etc. form a third row of checking cores.

The three cores of a column, namely, cores 70, 72, and 74, are selected so that each requires a different magnetomotive force to switch it from one stable state to its other stable state. For example, assume that a write "1" pulse applied to winding 76 will apply a magnetomotive force that will tend to drive cores 70, 72 and 74 toward positive saturation. A core in its "0" state resides in a state of negative magnetic remanence. Core 70 is selected so that a write pulse of 50 ma. or more will switch it from a negative remanent state toward its positive remanent state; however core 72 might require 80 ma. or more to be switched whereas core 74 might require 110 ma. of current to change the state of such core. The range of driving currents selected is merely illustrative and it is understood that the choice will depend upon circuit design considerations known to those skilled in coincident current core-driving techniques.

There are various ways in which this differential response to a given magnetomotive force can be obtained. Core 74 may be larger than core 72 and the latter made larger than core 70, the sizes being selected so that only core 70 switches when a predetermined minimum magnetomotive force is applied via common drive winding 76, whereas only cores 70 and 72 will switch when a second predetermined minimum magnetomotive force is applied to common drive winding 76. All three cores such as 70, 72 and 74, associated with a common drive winding will switch only if the current pulse in such winding exceeds a third predetermined minimum current level. If desired, the trio of check cores associated with a common drive winding may be of the same size but made of different materials whose hysteresis loop characteristics differ sufficiently to permit the desired differential switching characteristics for the same applied magnetomotive force. Yet another way to practice the invention is to bias the check cores in the second row toward negative saturation and bias the check cores in the third row further toward negative saturation, the amount of bias varying with the operating parameters of the reading and writing circuits. Still another way to practice the invention is the one illustrated in FIG. 2 wherein more turns are placed on cores in the first row of the checking circuit, with fewer turns being placed on cores in the second row, and the least turns being placed on cores in the third row. Consequently for a given applied driving current pulse, a core in the first row will switch more readily than a core in the second row, and the latter will switch more readily than a core in the third row.

Winding 84 is a sense winding which has a current induced therein when any of the cores in the first row switches from its "1" (store state) state to its "0" state (non-store state). Such induced current is fed into a conventional amplifier 86, and the amplified signal is employed in any output utilization circuit. The present invention requires that the sense amplifier 86 be biased so that it does not produce an amplified output signal unless two or more cores in row 1 switch from their "1" states to their "0" states. A single first row core switching will not be effective to actuate sense amplifier 86. Where the amplifier is a tube, the grid can be sufficiently negatively biased to obtain such discrimination. Sense winding 88 threads all those cores in the second row that are associated with a Y-driver line indicative of an even parity instruction. For example, Y-driver lines indicative of the instructions 011000, 011110, 110000, etc. would represent even parity instructions and Y-driver lines indicative of the instructions 010000, 011100, or 011010 etc. would represent odd parity instructions. Sense winding 88 feeds into amplifier 90 whereas sense winding 92 feeds into another amplifier 94. Sense winding 96 threads all the check cores of the third row, such winding 96 feeding its output signals to amplifier 98. A reset winding 100 threads all the cores of the checking array so that all the cores may be simultaneously reset to their respective "0" states, the sense amplifiers being disabled or otherwise not responsive to induced currents in their respective sense windings 84, 88, 92 and 96 during such resetting interval. The Y-driver lines, as well as the X-driver lines, are threaded through the cores in the magnetic memory array 60 in a manner more completely described in the above noted Durgin et al. copending application.

The operations of the checking circuit will now be described with reference being had to FIGS. 2 and 3. Assuming that only a single Y-driver 110000 is putting out sufficient current during a write instruction to switch some fully selected cores in the magnetic memory array 60. Such a single Y-driver will switch core 70′ in the first row and the current induced in sense winding 84 is insufficient to actuate sense amplifier 86. If another Y-driver is putting out current at the same time as Y-driver 110000, for example, Y-driver line 100000, then core 70‴ will switch. The simultaneous switching of cores 70′ and 70‴ will cause sense amplifier 86 to be actuated, such amplifier being connected to excite an alarm circuit not shown to indicate that more than one instruction or address is being sent to the magnetic memory unit 60 so that corrective action may be taken. FIG. 3*d* illustrates the type of error detectable by sense amplifier 86.

If a particular Y-driver is putting out too much current so that a half select core in the magnetic memory unit 60 may be fully switched, such excessive current will be detected by the switching of a core in the third row of the check cores. Such switching of a core in the third row will actuate sense amplifier 98, the latter being connectable to a suitable alarm circuit not shown. FIG. 3*c* represents an example of the type of Y-driver error that is detectable by amplifier 98.

If a Y-driver winding is carrying the proper amount of current, such current will be sufficient to switch the first two cores in a trio of cores associated with such drive winding. FIG. 3*a* represents the condition of proper single Y-drive address of a register in the magnetic memory array 60. It is noted that sense amplifiers 90 and 94 are connected to their respective sense windings 88 and 92 so that if a core in row 2 does not switch after a particular Y-drive line has been selected, then neither amplifier 90 nor amplifier 94 will be actuated. Such failure on the part of either of said amplifiers to detect a core being switched will result in a suitable alarm circuit being switched. FIG. 3*b* represents the type of error detectable by either amplifier 90 or 94.

The second row of cores in the checking array of FIG. 2 serves also as a means for obtaining a parity check of the original address emanating from address register 10. When the Y-plane portion of the address register 10 is entered with a particular instruction represented in binary form, the parity of the instruction is transmitted to a compare station that stores the parity of the instruction. The station could be a flip-flop that is set or not depending upon the parity of the instruction. Each sense amplifier 90 and 94 has an output terminal T or T′ that carries a signal to such compare station. If an even parity instruction has been sent to the memory array 60 then sense amplifier 90 would be actuated and an output signal appearing at terminal T would be sent to such compare station to jibe with the parity of the instruction entering the Y-address portion register 10. If the parity of the Y-plane instruction in the address register 10 is odd, then the output signal appearing at terminal T′ of amplifier 94 would be sent to the compare station to test whether or not there is a parity check. It is immaterial to the practice of the invention as to what type of parity check is employed. What is significant in the present invention is the fact that the bistable cores in the second row of the array of check cores and their amplifiers 90 and 94 serve not only to indicate whether or not a particular memory core driver is of the proper current strength, but they also aid in indicating whether or not there is a parity check. This dual role of the check cores 72, 72′, 72″, etc. reduces the overall equipment normally needed in checking circuits.

It is understood that whatever has been shown and described relative to Y-plane core drivers applies equally to X-plane core drivers, since the check core array is applied to both coordinate drivers. A reset winding 100 carries current for resetting all the cores in the checking array to their respective "0" states, or states of negative remanence, after each instruction, in order to prepare for the checking of the transmission of the next instruction to the memory array 60.

From what has been shown and described above, a checking system has been disclosed which relies upon core logic to detect all single intermittent failures in a memory address system as well as to check parity. The invention can be readily adapted to check read selection as well as write selection. In checking read selection, another array of checking cores will be placed on lines 50, 51, etc. for the Y-plane driving circuit and X-plane driving circuit, each array of checking circuits being disabled by conventional means when the other is being employed. Half-select pulses and fully selected pulses must not deviate from a predetermined range of values to the point where a half-select pulse is strong enough to act as a pulse having a "fully selected" value, or the latter is so weak that it fails to perform its full selection function. The present invention permits a check of the close tolerances on current strengths required in a coincidence-current type of drive of magnetic cores.

While there has been shown and described and pointed out the fundamental novel features of the invention as applied to a perferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A checking circuit for a core memory unit employing *n* current drivers wherein each current driver includes a winding that is identifiable with a particular instruction being sent to said core memory comprising: three rows of *n* bistable cores in each row, each core in a row being threaded by a single current driver winding so that there are *n* columns of three bistable cores threaded by individual current drivers, each core in a column being wound with different turns of winding of said current driver so as to tend to switch from a non-store state to a store state when a current pulse is applied to a current driver common to said column, each core in a given column having a different reluctance to being switched in response to the same driving current than another core in the same column, due to said different turns, each core in a column being wound with turns of winding of said current driver sufficient to normally cause switching of two cores in a column in response to current flowing in said turns of winding, whereby in the absence of the switching of two cores a first error is indicated: first detection means coupled to a first one of said three rows of cores and responsive to the simultaneous switching of more than one core in said first row to indicate the appearance of a second error; second detection means coupled to a second row of said three rows of cores, said second detection means including means coupled to those cores of said second row that are threaded by current drivers representative of an instruction having odd parity and including means coupled to those cores of said second row that are threaded by current drivers representative of an instruction having even parity, whereby said second detection means detects whether an even parity core or an odd parity core in said second row has switched; and third detection means coupled to all of the cores of the third row of said three rows of cores and responsive to the switching of anyone of said cores in said third row to indicate the appearance of a third error.

2. An error checking circuit for a core memory employing $n$ current drivers, wherein each current diver includes a winding that is identifiable with a particular instruction being sent to said core memory, said current drives being subject to error in a first instance by delivering not enough current, being subject to fault in a second instance by simultaneous actuation of more than one current driver, and being subject to fault in a third instance by delivering too much current, the combination comprising: three rows of $n$ bistable cores in each row, with the winding of each current drivers being wound about a column of three cores a progressively decreasing amount, whereby each current driver has associated therewith three cores capable of being switched by current being passed through said winding, said cores in each column being wound with a sufficient number of turns to cause the switching of two of them in response to a normal current being passed through the current driver winding associated therewith, whereby in the absence of the switching of two cores a first error is indicated: first detection means coupled to a first one of said three rows of cores and responsive to the simultaneous switching of more than one core in said first row to indicate the appearance of a second error; second detection means coupled to a second row of said three rows of cores; said second detection means including means coupled to those cores of said second row that are threaded by current drivers representative of an instruction having odd parity and including means coupled to those cores of said second row that are threaded by current drivers representative of an instruction having even parity, whereby said second detection means detects whether an even parity core or an odd parity core in said second row has switched; and third detection means coupled to all of the cores of the third row of said three rows of cores and responsive to the switching of anyone of said cores in said third row to indicate the appearance of a third error.

References Cited in the file of this patent

UNITED STATES PATENTS

| | | |
|---|---|---|
| 2,691,153 | Rajchman | Oct. 5, 1954 |
| 2,691,155 | Rosenberg et al. | Oct. 5, 1954 |
| 2,696,347 | Lo | Dec. 7, 1954 |
| 2,805,408 | Hamilton | Sept. 3, 1957 |
| 2,904,781 | Katz | Sept. 15, 1959 |
| 2,962,704 | Buser | Nov. 29, 1960 |

FOREIGN PATENTS

| | | |
|---|---|---|
| 1,158,080 | France | June 6, 1958 |